(12) United States Patent
Glassman et al.

(10) Patent No.: US 7,616,860 B2
(45) Date of Patent: Nov. 10, 2009

(54) METHODS AND APPARATUSES FOR DISPLAYING CONTENT THROUGH A STORAGE DEVICE

(75) Inventors: Ellen Glassman, Closter, NJ (US); David Farrage, Cliffside Park, NJ (US); Yumiko Takagi, Upper Saddle River, NJ (US); Michelle Koza, San Francisco, CA (US); Paul H. Feinberg, River Vale, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 921 days.

(21) Appl. No.: 10/815,016

(22) Filed: Mar. 31, 2004

(65) Prior Publication Data
US 2005/0226593 A1 Oct. 13, 2005

(51) Int. Cl.
*H04N 5/76* (2006.01)
*H04N 7/00* (2006.01)

(52) U.S. Cl. .......................................... 386/46; 386/95
(58) Field of Classification Search ............ 386/45–46, 386/95, 125, 68–70
See application file for complete search history.

(56) References Cited

U.S. PATENT DOCUMENTS

| | | | |
|---|---|---|---|
| 6,243,328 B1 | 6/2001 | Fenner et al. | |
| 6,329,787 B1 * | 12/2001 | Ito et al. | 320/114 |
| 6,577,811 B1 * | 6/2003 | Kikuchi et al. | 386/98 |
| 6,757,479 B1 * | 6/2004 | Niikawa | 386/68 |
| 7,016,595 B1 * | 3/2006 | Ishino et al. | 386/46 |
| 2007/0271508 A1 * | 11/2007 | Audet | 715/530 |

* cited by examiner

*Primary Examiner*—Thai Tran
*Assistant Examiner*—Nigar Chowdhury
(74) *Attorney, Agent, or Firm*—Rader Fishman & Grauer, PLLC; Christopher M. Tobin

(57) ABSTRACT

In one embodiment, the methods and apparatuses store content on a storage device; detach the storage device from a recorder/playback device; and display the content on the storage device.

23 Claims, 7 Drawing Sheets

METHODS AND APPARATUSES FOR DISPLAYING CONTENT THROUGH A STORAGE DEVICE

FIELD OF THE INVENTION

The present invention relates generally to displaying content and, more particularly, to displaying content through a storage device.

BACKGROUND

There are many types of portable storage device that are utilized to store content such as photographs, graphics, audio tracks, video footage, and text. These portable storage devices are typically used in conjunction with recording and playback devices such as video cameras, digital still image cameras, digital audio recorders/players, computers, personal digital assistants, and the like.

As technology improves, the storage capacity increases while packaging size decreases along with costs. One of the benefits of using portable storage devices is that these devices are configured to be removable from the recorder/playback device. Compact flash, Memory Stick®, and DV tapes are a few examples of different portable storage devices.

In use, multiple storage devices are utilized with each recorder/playback device. The content within the storage devices can also be shared among multiple users by distributing the particular storage device.

SUMMARY

In one embodiment, the methods and apparatuses store content on a storage device; detach the storage device from a recorder/playback device; and display the content on the storage device.

BRIEF DESCRIPTION OF THE DRAWINGS

The accompanying drawings, which are incorporated in and constitute a part of this specification, illustrate and explain one embodiment of the methods and apparatuses for displaying content through a storage device. In the drawings.

DETAILED DESCRIPTION

The following detailed description of the methods and apparatuses for displaying content through a storage device refers to the accompanying drawings. The detailed description is not intended to limit the methods and apparatuses for displaying content through a storage device. Instead, the scope of the methods and apparatuses for displaying content through a storage device are defined by the appended claims and equivalents. Those skilled in the art will recognize that many other implementations are possible, consistent with the present invention.

References to "content" includes textual data, graphical data, video footage, digital images, audio data, and the like.

In one embodiment, the methods and apparatuses for displaying content through a storage device allows content stored within the storage device to be displayed without using a dedicated recorder/playback device such as a digital camera, video camera, audio recorder, computer, television, and the like. In one embodiment, the storage device is a removable from the recorder/playback device. Further, the storage device is also portable.

In one embodiment, by displaying content stored within the storage device, the storage device is differentiated and distinguished from among other storage devices based on the displayed content. In this embodiment, the methods and apparatuses for displaying content through a storage device is utilized as a tool in identifying a particular storage device.

In another embodiment, the storage device entertains viewers by displaying the stored content without using any additional devices. In this embodiment, there are multiple modes that are available to display the stored content such as displaying multiple images in sequence similar to a slide show, displaying a single image, and displaying multiple images simultaneously by splitting the display screen into multiple sections.

In yet another embodiment, the storage device includes a display screen that acts as an extension to a recorder/playback device. For example, the storage device and the recorder/playback device transmit information to each other. In one instance, the recorder/playback device transmits content to the storage device to be stored by the storage device. In another instance, the recorder/playback device transmits functional information to the storage device such that the display on the storage device acts as a display that is an extension of the recorder/playback device.

In one embodiment, the storage device communicates with another storage device. For example, a first storage device transfers content to a second storage device. Then, the second storage device displays the content transferred from the first storage device.

Figure 1:
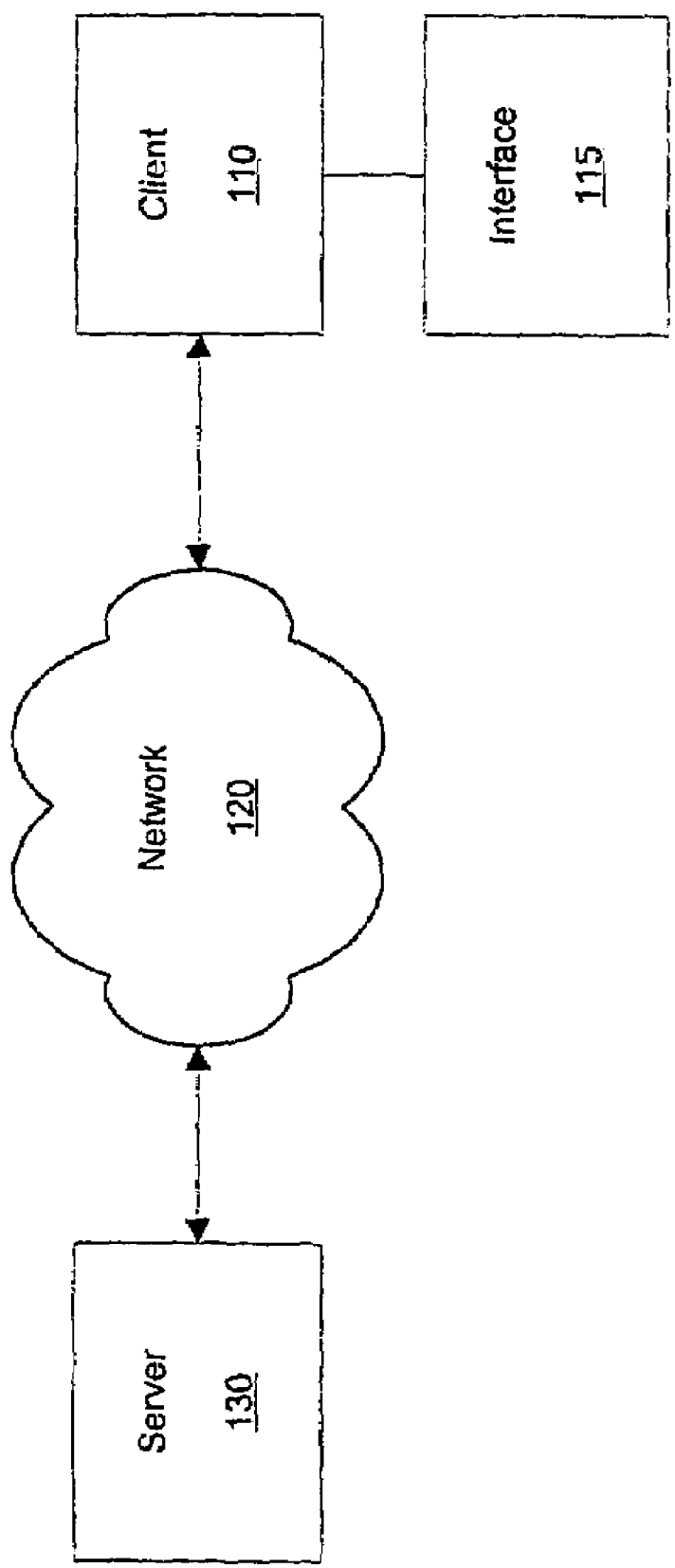
FIG. 1 is a diagram illustrating an environment within which the methods and apparatuses for displaying content through a storage device are implemented.

FIG. 1 is a diagram illustrating an environment within which the methods and apparatuses for displaying content through a storage device are implemented. The environment includes an electronic device 110 (e.g., a computing platform configured to act as a client device), a user interface 115, a network 120 (e.g., a local area network, a home network, the Internet, a wireless network), and a server 130 (e.g., a computing platform configured to act as a server). In another embodiment, the electronic device 110 and the server 130 are directly connected with each other.

In one embodiment, the electronic device 110 is the storage device, and the server 130 is the recorder/playback device.

In one embodiment, one or more user interface 115 components are made integral with the electronic device 110 (e.g., keypad, video display screen, input and output interfaces such as a display and speakers in the same housing). In one embodiment, the user utilizes interface 115 to access and control content and applications stored in electronic device 110, server 130, or a remote storage device (not shown) coupled via network 120.

In accordance with the invention, embodiments of displaying content through a storage device below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
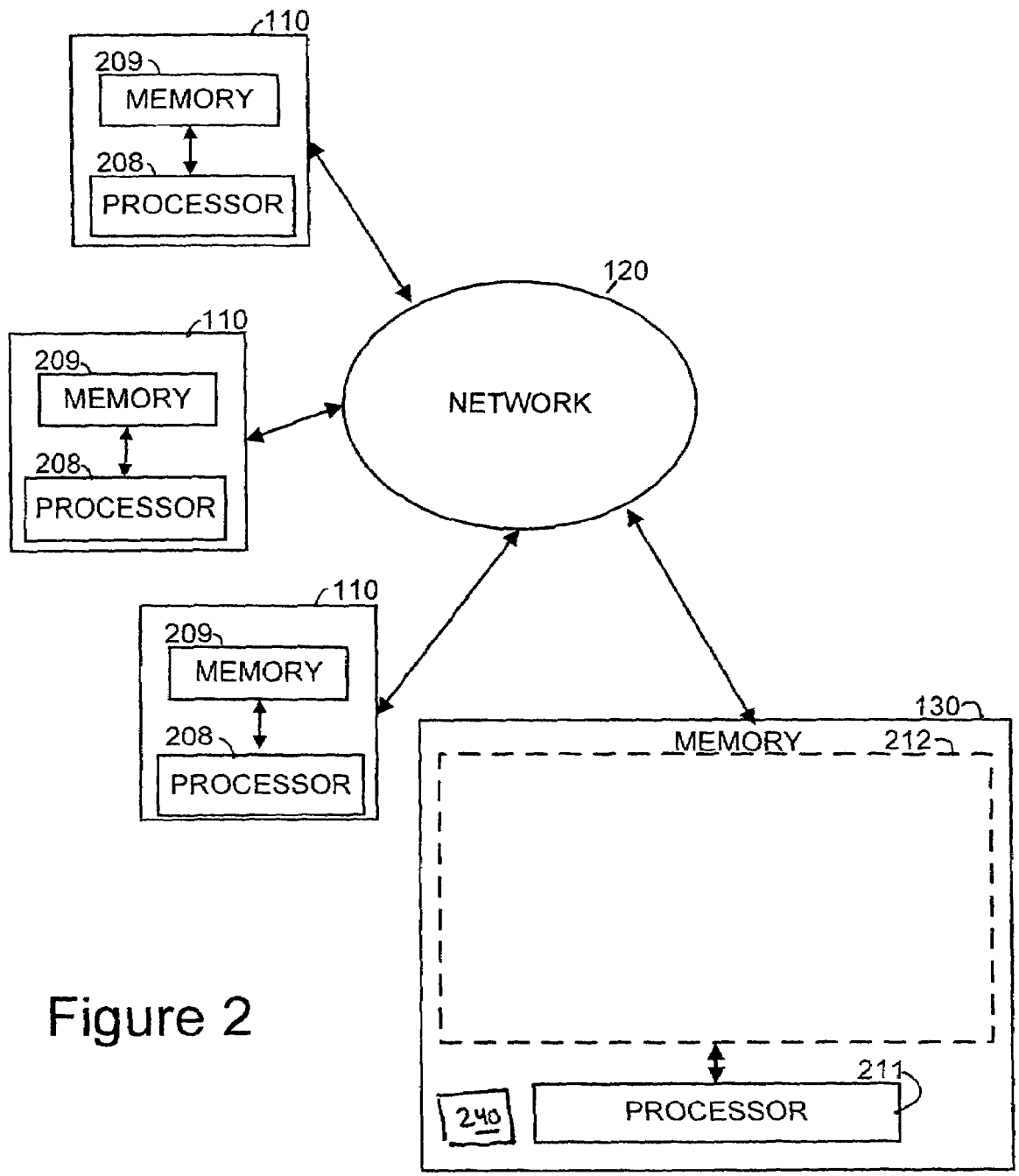
FIG. 2 is a simplified block diagram illustrating one embodiment in which the methods and apparatuses for displaying content through a storage device are implemented.

FIG. 2 is a simplified diagram illustrating an exemplary architecture in which the methods and apparatuses for displaying content through a storage device are implemented.

The exemplary architecture includes a plurality of electronic devices 110, a server device 130, and a network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. In one embodiment, a unique user operates each electronic device 110 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one embodiment, the plurality of client devices 110 and the server 130 include instructions for a customized application for displaying content through a storage device. In one embodiment, the plurality of computer-readable media 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on capturing and storing content related to an event as determined using embodiments described below.

Figure 3:
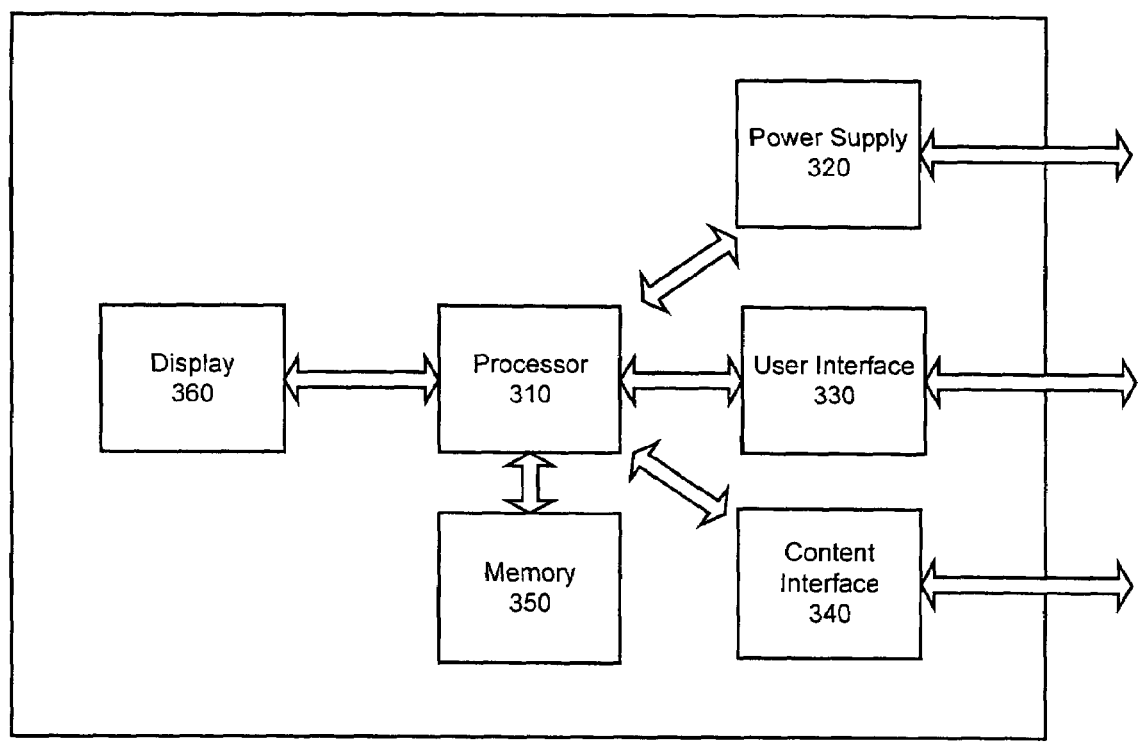
FIG. 3 is a simplified block diagram illustrating a system, consistent with one embodiment of the methods and apparatuses for displaying content through a storage device.

FIG. 3 is a simplified diagram illustrating an exemplary architecture of the electronic device 110 in which the methods and apparatuses for displaying content through a storage device are implemented.

In one embodiment, the electronic device 110 is a portable storage device having a display integrated within the portable storage device.

In one embodiment, the electronic device 110 includes a processor 310, a power supply 320, a user interface 330, content interface 340, memory 350, and a display 360. In one embodiment, the processor 310 communicates with the power supply 320, the user interface 330, the content interface 340, the memory 350, and the display 360.

In one embodiment, the power supply 320 supplies electrical power to the electronic device 110. In one embodiment, the power supply 320 is a rechargeable battery utilizing technologies such as a lithium ion, lithium polymer and the like. In one embodiment, the power supply 320 is recharged from outside the electronic device 110 through an electrical connection with the electronic device 110. In another embodiment, the power supply 320 also acts as a port to connect to other devices. In yet another embodiment, the power supply 320 is recharged by placing the electronic device 110 onto a charging matt which charges the power supply 320 through electromagnetic waves.

In one embodiment, the processor 310 manages the resources of the power supply 320 to conserve energy when the electronic device 110 is not in use.

In one embodiment, the user interface 330 receives signals from the user of the electronic device 110. For example, the user interface 330 receives instructions on how the content within the memory 350 is shown on the display 360. In one example, the user selects the content that is shown by the display 360. In another example, the user selects the manner in which the content is shown on the display 360 such as a slide show of multiple images, a static image, a sampling of a video stream, and the like.

In one embodiment, the user interface 330 includes a button that allows the user to select options from a menu of choices. In another embodiment, the user interface 330 includes a touch screen, keys, a pointing device, and/or a microphone.

In one embodiment, the content interface 340 allows the electronic device 110 to communicate with other devices such as the server 130 and other electronic devices 110. In one embodiment, the content interface 340 allows the exchange of content between the electronic device 110 and the server 130 and other devices. In another embodiment, the content interface 340 allows the exchange of content between multiple electronic devices 110.

In one embodiment, the memory 350 stores data such as content, profile information for the electronic device 110, profile information for other devices, account information, and the like. In one embodiment, the memory 350 includes writable solid-state memory, magnetic media, RAM, and ROM.

In one embodiment, the display 360 provides information to the user of the electronic device 110. In one embodiment, the display 360 supplies visual information through a graphical display such as liquid crystal display, an organic light emitting diode display, and the like. In one embodiment, the graphical display generates a color image. In another embodiment, the graphical display generates a monochrome image. In yet another embodiment, the graphical display generates an animated sequence of images.

In another embodiment, the display 360 supplies audio information through a speaker. The display 360 presents the user with the content.

Figure 4:
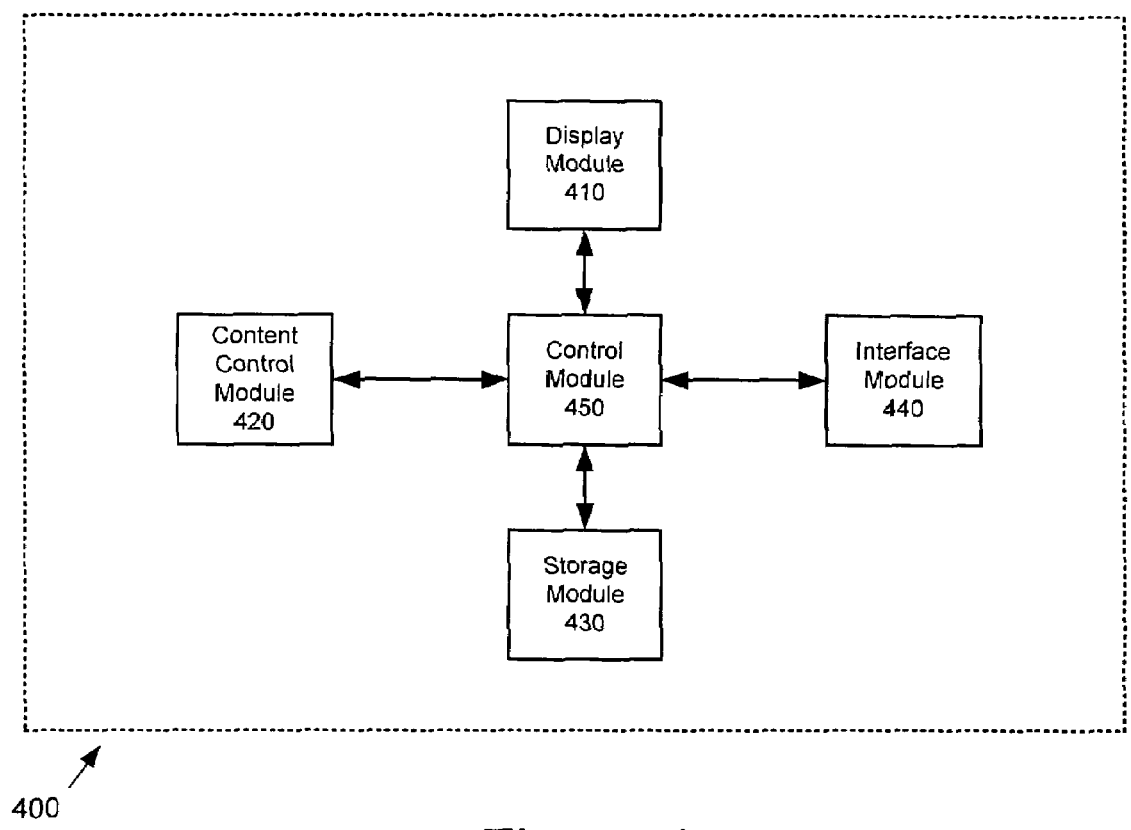
FIG. 4 is a simplified block diagram illustrating a system, consistent with one embodiment of the methods and apparatuses for displaying content through a storage device.

FIG. 4 illustrates one embodiment of a storage device 400. In one embodiment, the storage device 400 is embodied within the electronic device 110. In yet another embodiment, the storage device 400 is embodied within both the electronic device 110 and the server 130.

In one embodiment, the storage device 400 includes a display module 410, a content control module 420, a storage module 430, an interface module 440, and a control module 450.

In one embodiment, the control module 450 communicates with the display module 410, the content control module 420, the storage module 430, and the interface module 440. In one embodiment, the control module 450 coordinates tasks, requests, and communications between the display module 410, the content control module 420, the storage module 430, and the interface module 440.

In one embodiment, the display module 410 displays content that is stored within the storage module 430. In one embodiment, the display module 410 is a liquid crystal display, an organic LED display, and the like.

In one embodiment, the content control module 420 organizes the content stored within the storage module 430 to display on the display module 410. In one embodiment, the content control module 420 copies the content for display on the display module 410 to a separate location within the storage module 430. For example, if multiple pieces of content are selected to be displayed, then those pieces of content are copied into a designated area of the storage module 430 to be shown on the display module 410.

In another embodiment, the content control module 420 links to the content stored within the storage module 430 for displaying on the display module 410. For example, if multiple pieces of content are selected to be displayed, then the content control module 420 initiates links to those pieces of content such that those pieces of content can be identified and access to be shown on the display module 410.

In one embodiment, the storage module 430 stores content within the storage device 400. In one embodiment, the storage module 430 includes an area designated to content that is shown on the display module 410. In another embodiment, the storage module 430 includes a listing that identifies content that is shown on the display module 410.

In one embodiment, the interface module 440 receives a signal through an input device operated by the user of the storage device 400. In one embodiment, the interface module receives instructions from the user. For example, instructions include turning on/off the display module 410, selecting content to be displayed by the display module 410, and selecting a mode of operation such as displaying a single image, displaying multiple images simultaneously, and displaying a sequential slide show of single images.

The storage device 400 in FIG. 4 is shown for exemplary purposes and is merely one embodiment of the methods and apparatuses for displaying content through a storage device. Additional modules may be added to the system 400 without departing from the scope of the methods and apparatuses for displaying content through a storage device. Similarly, modules may be combined or deleted without departing from the scope of the methods and apparatuses for displaying content through a storage device.

Figure 5:
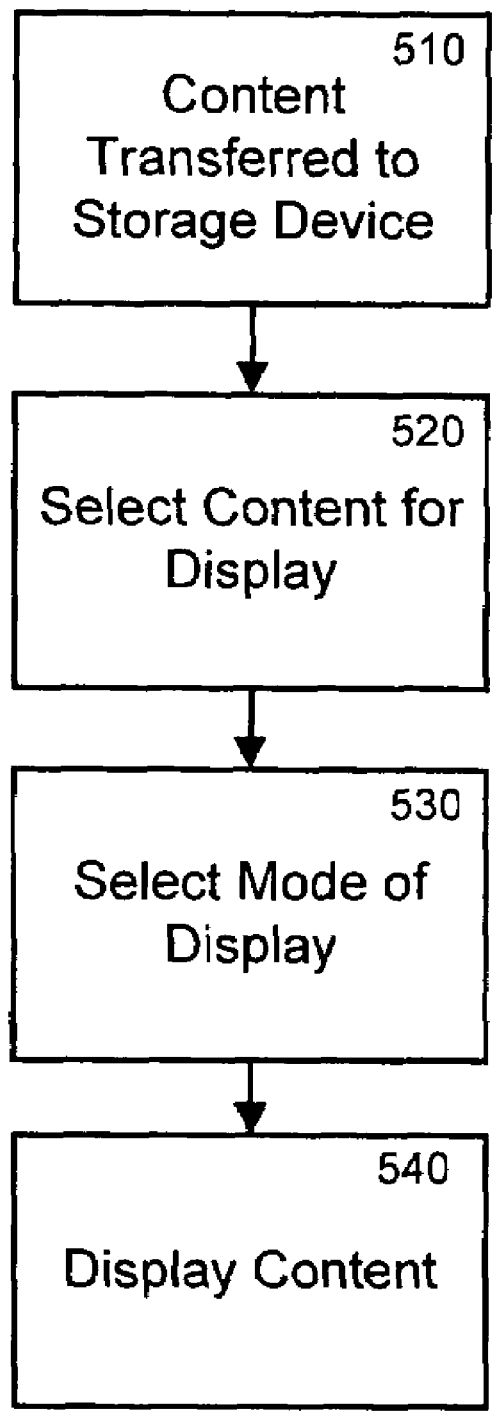
FIG. 5 is a flow diagram consistent with one embodiment of the methods and apparatuses for displaying content through a storage device.

The flow diagram as depicted in FIG. 5 is one embodiment of the methods and apparatuses for displaying content through a storage device. The blocks within the flow diagrams can be performed in a different sequence without departing from the spirit of the methods and apparatuses for displaying content through a storage device. Further, blocks can be deleted, added, or combined without departing from the spirit of the methods and apparatuses for displaying content through a storage device.

The flow diagram in FIG. 5 illustrates an exemplary application of the methods and apparatuses for displaying content through a storage device. This exemplary application illustrates utilizing the electronic device as a storage device that displays content that is stored within the storage device via an integrated display.

In Block 510, content is transferred to the storage device. In one embodiment, the content includes textual data, graphical data, video footage, digital images, audio data, and the like. In one embodiment, the content is transmitted to the storage device from a recorder/playback device such as a computer, digital camera, video camera, audio player/recorder, and the like.

In one embodiment, the content is transmitted to the storage device via a wireless connection, a wired connection, or a direct device to device connection. For example, the wireless connection includes WiFi protocol, Ultra Wideband protocol, ISM Band protocol, cellular networks, and Bluetooth protocol. The wired connection includes a USB connection, an Ethernet connection, and the like.

In one embodiment, once the content is transmitted to the storage device, the connection between the storage device and the recorder/playback device is no longer needed. In another embodiment, the connection between the storage device and the recorder/playback device is utilized to allow the storage device to display functional controls for the recorder/playback device. For example, the storage device is configured to display soft keys that are specific to the particular recorder/playback device. In one embodiment, the use of the storage device to provide a display for the recorder/playback device allows the recorder/playback device to omit an attached display with the recorder/playback device.

In Block 520, content is selected for display on the storage device. In one embodiment, a single piece of content (e.g. video track, audio track, digital image) is selected for display on the storage device. In an alternate embodiment, multiple pieces of content are selected for display on the storage device. In one embodiment, the content is selected through the user interface 330.

In Block 530, the mode of display is selected. In one embodiment, single piece of content is displayed. In another embodiment, multiple pieces of content are simultaneously displayed by splitting the display among the multiple pieces of content. In yet another embodiment, multiple pieces of content are serially displayed in a slide-show manner.

In another embodiment, a multiple storage device display mode is selected. In this embodiment, content is coordinated and displayed on multiple storage devices. For example, the storage device detects other storage devices within a predetermined distance. Then, the selected content within each of the devices is detected. In one instance, the selected content within each of the devices is displayed on the corresponding storage device and ordered according to play sequentially based on the time stamp of the content. In another instance, the content is ordered based on the subject matter of the content. In yet another instance, the content is ordered based on the author of the content.

In Block 540, the selected content from the Block 520 is displayed according to the mode selected in the Block 530. In one embodiment, the content is displayed upon activation of the storage device. In another embodiment, the content is continuously displayed regardless of whether the storage device is turned on or off.

Figure 6:
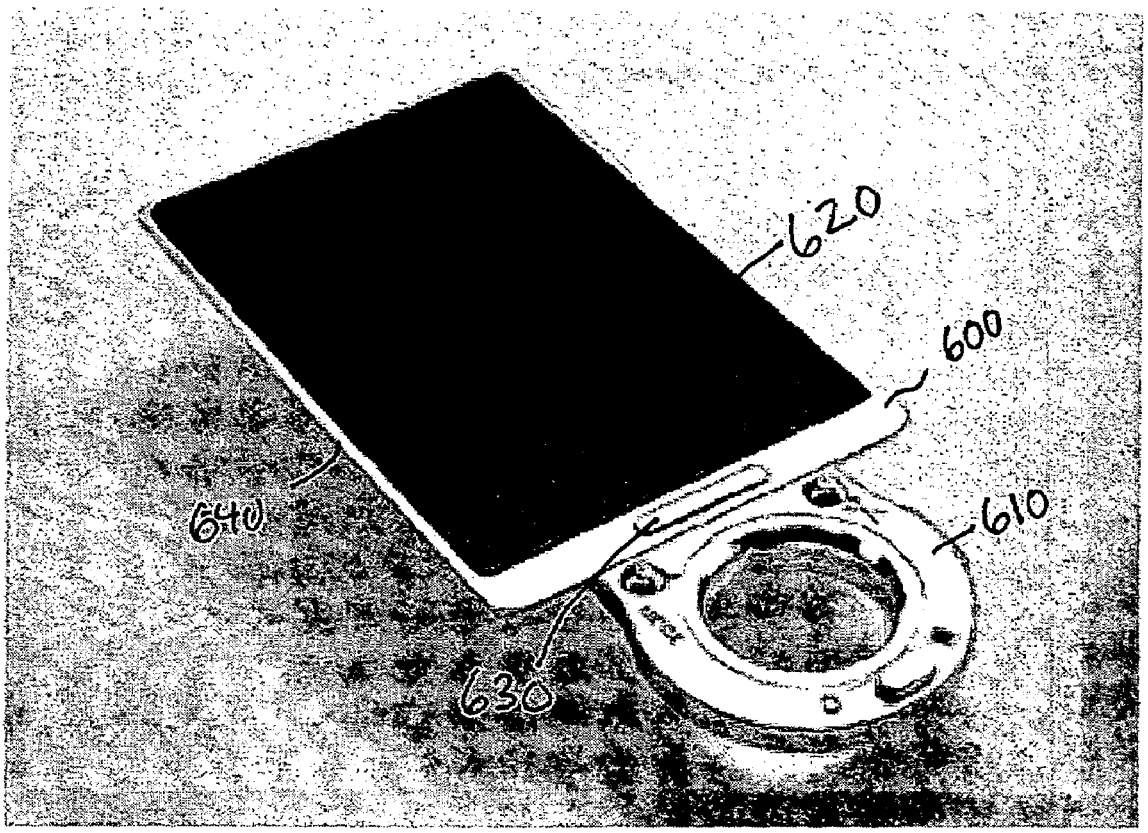
FIG. 6 is a diagram illustrating one embodiment of a storage device within the methods and apparatuses for displaying content through a storage device.

FIG. 6 is an exemplary embodiment of a storage device 600 in conjunction with a digital camera 610. The storage device 600 is shown coupled to the digital camera 610. The storage device 600 includes a display 620, a button 630, and an attachment area 640. In one embodiment, the display 620 is a liquid crystal display. In another embodiment, the display 620 is an organic light emitting diode display.

In one embodiment, the button 630 is utilized to operate the storage device in functions such as selecting content to be displayed and selecting the mode of display.

In one embodiment, the attachment area 640 is utilized to physically attach the storage device 600 to the digital camera 610. In one embodiment, the attachment area 640 is also utilized to logically connect the storage device 600 to the digital camera 610 in order to transmit content. In another embodiment, the storage device 600 and the digital camera 610 utilize a wireless transmission means such as Bluetooth, WiFi, and cellular networks to transmit content such that the storage device 600 and the digital camera 610 do not need to be physically attached to each other in order to communicate.

In another embodiment, the attachment area 640 is utilized to physically attach the storage device 600 to another object. For example the attachment area 640 is a magnet that is able to attach the storage device 600 to a metal object such as a refrigerator. In this example, the storage device 600 can be utilized as a digital picture frame. In another example, even though the storage device 600 and the digital camera 610 utilize a wireless transmission means to communicate, the attachment area 640 is utilized to connect the storage device 600 to the digital camera 610.

In one embodiment, the display 620 is utilized to show content that is stored within the storage device 600. For example, selected content is shown on the display 620 to identify content on the storage device 600. In another example, the display 620 shows various content to entertain a viewer without needing to find another playback device such as the digital camera 610 to view the content stored on the storage device 600.

In another embodiment, the display 620 is utilized as an extension of the digital camera 610. For example, the display 620 shows the functional aspects of operating the digital camera 610 such as displaying current views of the digital camera 610 and displaying captured content.

Figure 7:
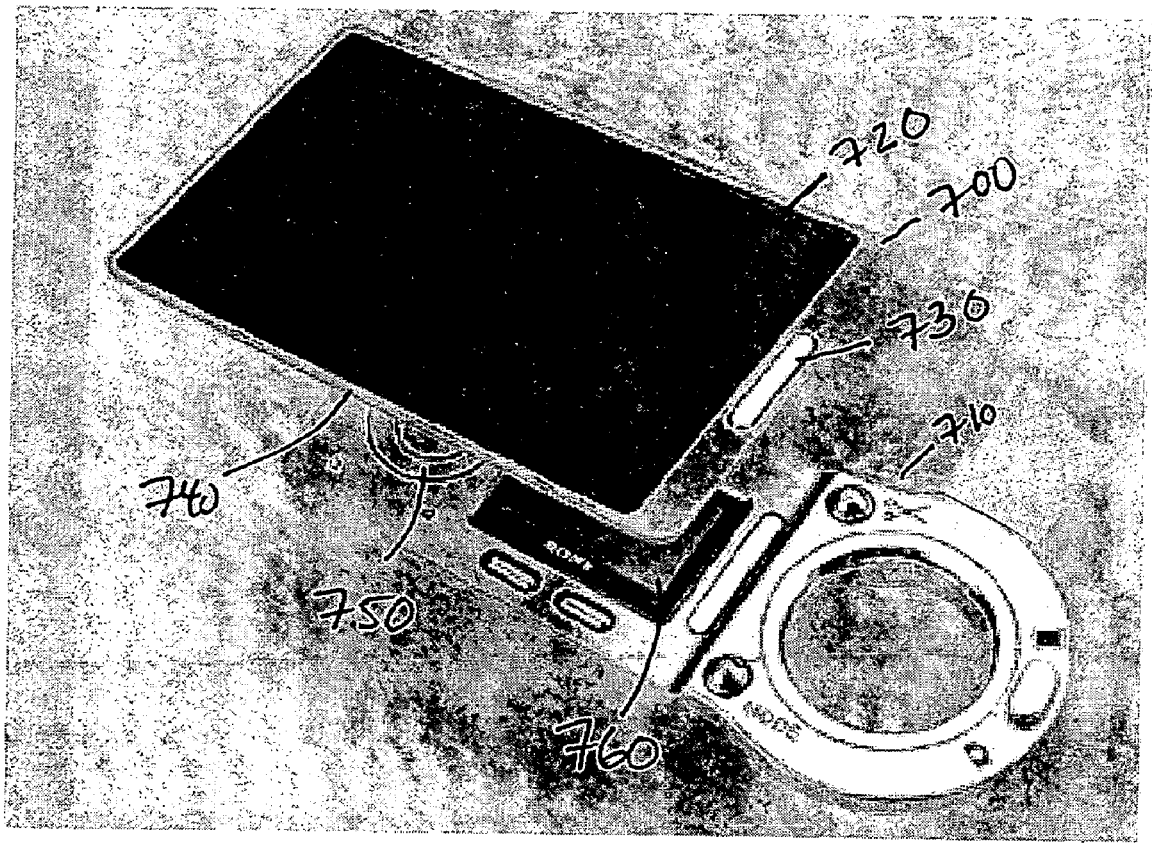
FIG. 7 is a diagram illustrating one embodiment of a storage device within the methods and apparatuses for displaying content through a storage device.

FIG. 7 is an exemplary embodiment of a storage device 700 in conjunction with a digital camera 710. The storage device 700 is shown detached from the digital camera 710. The storage device 700 includes a display 720, a button 730, and an attachment area 740. The display 720, the button 730, and the attachment area 740 are similar to the display 620, the button 630, and the attachment area 640 as shown in FIG. 6.

In one embodiment, the digital camera 710 includes a camera attachment 750 that is configured to couple with the attachment area 740. In one embodiment, the digital camera 710 also includes a camera display 760 which is utilized to display content within the digital camera 710 and functions relating to the digital camera 710 when the digital camera 710 and the storage device 700 are no longer connected.

The digital cameras 610 and 710 are shown for exemplary purposes. In another embodiment, a different playback/recording device is substituted for the digital cameras 610 and 710.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
    storing content on a portable memory device, said content including an image captured using a recorder/playback device;
    detaching the portable memory device from the recorder/playback device, thereby providing access to a secondary user interface on the recorder/playback device that is inaccessible when the portable memory device is attached;
    displaying the image on the portable memory device while the portable memory device is detached from the recorder/playback device; and
    displaying functional controls for the recorder/playback device while the portable memory device is connected to the recorder/playback device.

2. The method according to claim 1 further comprising transmitting the content from the recorder/playback device to the portable memory device.

3. The method according to claim 1 further comprising selecting the image for display on the portable memory device.

4. The method according to claim 1 further comprising selecting a mode to display the image, wherein the mode includes displaying the image as part of sequentially displaying multiple pieces of content.

5. The method according to claim 1 further comprising selecting a mode to display the image, wherein the mode includes displaying the image as part of simultaneously displaying multiple pieces of content.

6. The method according to claim 1 wherein the recorder/playback device is one of a digital camera, a video camera, an audio recorder/player, a computer, or a television.

7. The method of claim 1, wherein said functional controls include soft keys that are particular to the recorder/playback device.

8. The method of claim 1, wherein the portable memory device is configured to include an attachment area, said attachment area including a magnet for attaching the portable memory device to a metallic object, such that the portable memory device displays the image while attached to the metallic object.

9. The method according to claim 1, further comprising storing content on an internal memory in the portable recorder/playback device, said content including a second image captured using a portable recorder/playback device, when said portable memory device is detached from the portable recorder/playback device.

10. The method according to claim 1, further comprising displaying a second image on a second display, the second display being a part of the secondary user interface, and wherein the user interface is positioned underneath portable memory device when the portable memory device is attached.

11. A portable imaging system, comprising:
    a portable memory device coupled to a recorder/playback device;
    the portable memory device comprising:
        interface means for connecting to and detaching from a recorder/playback device;
        storage means for storing content including an image captured using the recorder/playback device;
        display means for displaying the image while the portable memory system is detached from
        the recorder/playback device; and
        the display means is configured to display functional controls for the recorder/playback device while the portable memory device is connected to the recorder/playback device, and
    the recorder/playback device comprising:
        an image capture device;
        a secondary user interface that is inaccessible when the portable memory device is attached, that becomes accessible when the portable memory device is detached.

12. The portable memory system of claim 11, wherein said functional controls include soft keys that are particular to the recorder/playback device.

13. The portable memory system of claim 11, further comprising:
    an attachment area, including a magnet for attaching the portable memory system to a metallic object, such that the display means displays the image while the portable memory system is attached to the metallic object.

14. The portable memory system of claim 11, wherein the interface means connects to and detaches from the recorder/playback device via a wireless connection.

15. The portable memory system of claim 11, wherein the image is displayed as part of sequentially displaying multiple pieces of content.

16. The portable memory system of claim 11, wherein the recorder/playback device is one of a digital camera and a computer.

17. The portable imaging system of claim 11, wherein the secondary user interface includes function keys positioned underneath the portable memory device, when the portable memory device is attached.

18. The portable imaging system of claim 11, further wherein the secondary user interface includes a second display that is accessible when the portable memory device is detached from the portable recorder/playback device, and inaccessible and positioned underneath the portable memory device when the portable memory device is attached to the portable recorder/playback device.

19. A portable imaging device, the portable imaging device comprising:
   a portable memory device coupled to a recorder/playback device;
   the portable memory device comprising:
      an interface, which connects to and detaches from a recorder/playback device;
      a memory, in operative communication with the interface, which stores content including an image captured using the recorder/playback device; and
      a display, in operative communication with the memory, which displays the image while the portable memory device is detached from the recorder/playback device; and
      the display is configured to display functional controls for the recorder/playback device while the portable memory device is connected to the recorder/playback device, and
   the recorder/playback device comprising:
      an image capture device;
      a secondary user interface that is inaccessible when the portable memory device is attached, but becomes accessible when the portable memory device is detached.

20. The portable memory device of claim 19, wherein said functional controls include soft keys that are particular to the recorder/playback device.

21. The portable memory device of claim 19, further comprising: an attachment area, including a magnet for attaching the portable memory system to a metallic object, such that the display means displays the image while the portable memory system is attached to the metallic object.

22. The portable imaging system of claim 19, wherein the secondary user interface includes function keys positioned underneath the portable memory device, when the portable memory device is attached.

23. The portable imaging system of claim 19, wherein the secondary user interface includes a second display that is accessible when the portable memory device is detached to the portable recorder/playback device, and inaccessible and positioned underneath the portable memory device when the portable memory device is attached to the portable recorder/playback device.

* * * * *

UNITED STATES PATENT AND TRADEMARK OFFICE
CERTIFICATE OF CORRECTION

| | | |
|---|---|---|
| PATENT NO. | : 7,616,860 B2 | Page 1 of 1 |
| APPLICATION NO. | : 10/815016 | |
| DATED | : November 10, 2009 | |
| INVENTOR(S) | : Glassman et al. | |

It is certified that error appears in the above-identified patent and that said Letters Patent is hereby corrected as shown below:

On the cover page,

[*] Notice:   Subject to any disclaimer, the term of this patent is extended or adjusted under 35 USC 154(b) by 921 days Delete the phrase "by 921 days" and insert -- by 1087 days --

Signed and Sealed this

Thirty-first Day of August, 2010

David J. Kappos
*Director of the United States Patent and Trademark Office*